(12) United States Patent
Cho

(10) Patent No.: US 10,880,262 B2
(45) Date of Patent: Dec. 29, 2020

(54) COMMUNICATOR, VEHICLE HAVING THE SAME, AND CONTROL METHOD OF THE SAME

(71) Applicants: Hyundai Motor Company, Seoul (KR); Kia Motors Corporation, Seoul (KR)

(72) Inventor: JaeKyu Cho, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 37 days.

(21) Appl. No.: 16/264,859

(22) Filed: Feb. 1, 2019

(65) Prior Publication Data
US 2020/0120064 A1   Apr. 16, 2020

(30) Foreign Application Priority Data

Oct. 16, 2018 (KR) .......................... 10-2018-0123428

(51) Int. Cl.
*H01L 29/12* (2006.01)
*H04L 29/12* (2006.01)
*H04L 29/08* (2006.01)

(52) U.S. Cl.
CPC .......... *H04L 61/2007* (2013.01); *H04L 67/12* (2013.01)

(58) Field of Classification Search
CPC ............................ H04L 61/2007; H04L 67/12
USPC ......................................................... 709/245
See application file for complete search history.

(56) References Cited

U.S. PATENT DOCUMENTS

| 2005/0160174 | A1  | 7/2005  | Ingmar et al. |
| 2008/0043684 | A1* | 2/2008  | Hovey ................. H04L 69/161 370/338 |
| 2013/0272304 | A1  | 10/2013 | Kamble et al. |
| 2015/0039621 | A1* | 2/2015  | Mikolajczyk .......... G06F 16/58 707/740 |

(Continued)

FOREIGN PATENT DOCUMENTS

| KR | 101439489 B1       | 9/2014 |
| KR | 10-2015-0030099 A  | 3/2015 |

(Continued)

*Primary Examiner* — Tauqir Hussain
(74) *Attorney, Agent, or Firm* — Mintz Levin Cohn Ferris Glovsky and Popeo, P.C.; Peter F. Corless

(57) ABSTRACT

A communicator in a vehicle communication network may include: a memory configured to match a destination Internet Protocol (IP) address, to which at least one message is transmitted, with identification information of the at least one message, and to store the matched destination IP address and identification information in a table; and a controller configured to transmit a change flag when a message to be transmitted to at least one device is changed, to transmit identification information of the changed message to the at least one device, to generate a destination IP address based on identification information of the at least one device, and to allow the generated destination IP address and the identification information of the changed message to be matched with each other and stored in the table. The memory may be further configured to change the destination IP address with respect to the identification information of the at least one message stored in the table in response to a control signal transmitted by the controller.

20 Claims, 14 Drawing Sheets

(56) References Cited

U.S. PATENT DOCUMENTS

| | | | | |
|---|---|---|---|---|
| 2016/0173530 A1* | 6/2016 | Miyake | ............... | H04L 67/12 |
| | | | | 726/3 |
| 2016/0182093 A1* | 6/2016 | Yang | ............ | H03M 13/6527 |
| | | | | 714/776 |
| 2017/0013005 A1* | 1/2017 | Galula | ................. | H04L 67/12 |
| 2017/0150361 A1* | 5/2017 | Paryani | ............. | H04W 12/02 |
| 2017/0237695 A1* | 8/2017 | Katis | .................... | H04M 1/64 |
| | | | | 379/93.01 |
| 2018/0076970 A1* | 3/2018 | Han | ..................... | H04L 12/40 |
| 2018/0103108 A1* | 4/2018 | Kim | ..................... | H04L 69/06 |
| 2018/0234498 A1* | 8/2018 | Sangameswaran | ..... | H04L 12/18 |
| 2018/0295147 A1* | 10/2018 | Haga | .................... | H04W 4/40 |
| 2019/0007304 A1* | 1/2019 | Kawasaki | ............ | H04L 45/742 |
| 2019/0028933 A1* | 1/2019 | Kawasaki | ......... | H04W 36/0022 |
| 2019/0058613 A1* | 2/2019 | Maeda | ............ | H04L 12/40006 |
| 2019/0268420 A1* | 8/2019 | Acharya | ............. | H04L 45/74 |
| 2020/0053112 A1* | 2/2020 | Torisaki | ................ | H04L 12/40 |

FOREIGN PATENT DOCUMENTS

| KR | 10-2015-0074857 A | 7/2015 |
|---|---|---|
| KR | 10-2015-0128141 A | 11/2015 |
| KR | 10-1630729 B1 | 6/2016 |

* cited by examiner

FIG. 3A

| msg ID | DEVICE ID | IP address |
|---|---|---|
| msg1 | D2,D4 | 239.0.1.64 |
| msg2 | D2,D3 | 239.0.0.192 |
| msg3 | D2,D3,D4 | 239.0.1.192 |
| msg5 | D3,D4 | 239.0.1.128 |
| msg6 | D5 | 10.0.0.16 |

FIG. 3B

| DEVICE ID | msg ID |
|-----------|--------|
| D2 | msg7 |
| D3 | msg8 |
| D4 | msg10 |
| D5 | msg11 |

FIG. 4

| Byte 3 | | | | | | | | Byte 4 | | | | | | | |
|---|---|---|---|---|---|---|---|---|---|---|---|---|---|---|---|
| Bit7 | Bit6 | Bit5 | Bit4 | Bit3 | Bit2 | Bit1 | Bit0 | Bit7 | Bit6 | Bit5 | Bit4 | Bit3 | Bit2 | Bit1 | Bit0 |
| ERT | Rsrvd | Rsrvd | Rsrvd | AVN | ESU | ICU | HU | CLU | HUD | V2X | ADAS_PRK | RR_CMR | FR_CMR | L_CMR | R_CMR |

| DEVICE ID | msg ID |
|---|---|
| D1 | msg1,msg2,msg3 |
| D3 | ... |
| ... | ... |

| DEVICE ID | msg ID |
|---|---|
| D1 | msg1 |
| D3 | ... |
| ... | ... |

FIG. 9

| msg ID | DEVICE ID | IP address |
|--------|-----------|------------|
| msg1   | D2,D4     | 239.0.1.64 |
| msg2   | D3        | 10.0.0.128 |
| msg3   | D3,D4     | 239.0.1.128 |
| msg5   | D3,D4     | 239.0.1.128 |
| msg6   | D5        | 10.0.0.16  |

FIG. 11

| msg ID | DEVICE ID | IP address |
|---|---|---|
| msg1 | D2,D4 | 239.0.1.64 |
| msg2 | D3 | 10.0.0.128 |
| msg3 | D2,D3,D4 | 239.0.1.192 |
| msg4 | D2 | 10.0.0.64 |
| msg5 | D3,D4 | 239.0.1.128 |
| msg6 | D5 | 10.0.0.16 |

COMMUNICATOR, VEHICLE HAVING THE SAME, AND CONTROL METHOD OF THE SAME

CROSS-REFERENCE TO RELATED APPLICATION

This application claims the benefit of priority under 35 U.S.C. § 119 to Korean Patent Application No. 10-2018-0123428, filed on Oct. 16, 2018 in the Korean Intellectual Property Office, the disclosure of which is incorporated by reference herein in its entirety.

BACKGROUND

1. Technical Field

Embodiments of the present disclosure relate to a communicator, a vehicle having the same, and a method having the same, and more particularly, to a vehicle capable of assigning an Internet protocol (IP) address of at least one device in a communication between a plurality of devices, and a control method thereof.

2. Description of Related Art

Many modern vehicles use an electronic control unit (ECU) or a controller to communicate with a wide range of devices installed in the vehicle such as a camera, sensors, an input device, a display device, or the like via networks such as a controller area network (CAN), a FlexRay network, a media oriented system transport (MOST) network, and an Ethernet network. Typically, vehicles collect information for transmission to the ECU through a protocol conversion between heterogeneous networks inside of the vehicle using a gateway. However, a message request is concentrated on the gateway, and thus performance can deteriorate between devices, causing difficulty in software modularization.

As vehicular communication technology has progressed, the amount and transmission speed of messages transmitted via the in-vehicle network has increased. In this regard, industrial Ethernet has recently been applied to a vehicle. To implement Ethernet as the vehicle network, an Internet protocol (IP) address must be assigned to each electronic device in the vehicle. Typical IP address assignment methods include a static IP address assignment method and a dynamic IP address assignment method.

The static IP address assignment method has an advantage of reducing a network initialization (start-up) time but a disadvantage of reducing network flexibility. In addition, IP addresses are assigned upon manufacturing, and thus it is difficult to change an IP address later. For this reason, IP address management should be performed on most of electronic devices upon changing the ECU. Furthermore, when an electronic device is added after manufacturing, the IP addresses of all electronic devices related to transmission and reception must be changed according to address assignment rules.

The dynamic IP address assignment method has an advantage of increasing network flexibility but a disadvantage of having a long network wait time. Typically, all electronic devices should be operated normally as soon as the vehicle is started. However, due to the characteristics of the electronic device and in-vehicle network, IP address assignment is difficult when a dynamic IP address is assigned. Thus, it takes a long time to operate each electronic device.

SUMMARY

It is an aspect of the present disclosure to provide a communicator capable of dynamically assigning an IP address when a message to be transmitted or received is changed during communication with another device, and a control method thereof.

It is another aspect of the present disclosure to provide a vehicle capable of dynamically assigning an IP address when a message to be transmitted or received is changed in at least one device when a plurality of devices are operated, and a control method thereof.

Additional aspects of the present disclosure will be set forth in part in the description which follows and, in part, will be apparent from the description, or may be learned by practice of the present disclosure.

In accordance with embodiments of the disclosure, a communicator in a vehicle communication network may include: a memory configured to match a destination Internet Protocol (IP) address, to which at least one message is transmitted, with identification information of the at least one message, and to store the matched destination IP address and identification information in a table; and a controller configured to transmit a change flag when a message to be transmitted to at least one device is changed, to transmit identification information of the changed message to the at least one device, to generate a destination IP address based on identification information of the at least one device, and to allow the generated destination IP address and the identification information of the changed message to be matched with each other and stored in the table. The memory may be further configured to change the destination IP address with respect to the identification information of the at least one message stored in the table in response to a control signal transmitted by the controller.

The controller of the communicator may transmit the changed message to the at least one device based on the identification information of the at least one message stored in the table.

When the vehicle communication network is initiated, the controller of the communicator may determine whether a message to be transmitted to the at least one device is changed, transmit a no-change flag to a plurality of devices based on the table when it is determined that the message is not changed, and transmit a message to each of the plurality of devices based on the table when receiving the no-change flag from the plurality of devices.

The controller of the communicator may identify a destination IP address corresponding to identification information of the message based on the table, and transmit the message to the at least one device based on the identified destination IP address.

When the vehicle communication network is initiated, the controller of the communicator may determine whether a message to be transmitted to the at least one device is changed, transmit a no-change flag to the plurality of devices when it is determined that the message is not changed, generate a destination IP address based on the identification information of the received message and identification information of a device of the plurality of devices when receiving a change request flag and identification information of a message from the device, and allow the generated destination IP address and the identification information of the received message to be matched with each other and stored in the table.

The memory of the communicator may further store identification information of the at least one device and identification information of a message to be received with respect to identification information of the at least one device in a reception message identification information table, and when a change flag and identification information of a message is received by a device among a plurality of devices, the controller of the communicator may identify identification information of a message, which is matched with identification information of the device, in the reception message identification information table, and to change the identified identification information of the message so as to correspond to the received identification information of message.

The memory of the communicator may match identification information of the at least one device with identification information of the at least one message and to store the matched information in a table, and the controller may transmit a change request flag to a device among a plurality of devices when a message to be received from the device is changed, compare identification information of the at least one message stored in the table with a list of identification information of message received from the device, obtain change information of the at least one message, and to transmit the obtained change information of the at least one message to the device.

When the vehicle communication network is initiated, and when receiving a no-change flag from the device, the controller may determine whether a message to be transmitted and a message to be received are changed, and when it is determined that the message to be transmitted and the message to be received are not changed, transmit the no-change flat to the device.

Furthermore, in accordance with embodiments of the disclosure, a vehicle may include: a plurality of devices in a vehicle communication network, wherein each of the plurality of devices includes: a communicator configured to communicate with at least one other device, a memory configured to store a destination IP address table and a reception message table; and a controller configured to allow a message to be transmitted to the at least one other device based on the destination IP address table and identification information of a message. When a message, which is transmitted to a second device, is changed, a controller of a first device among the plurality of devices may transmit a change flag and identification information of the changed message to the second device, generate a destination IP address based on identification information of the second device, and allow the generated destination IP address and the identification information of the changed message to be matched with each other and stored in the memory of the second device.

When transmitting the changed message, the controller of the first device of the vehicle may transmit the changed message to the second device based on the generated destination IP address.

When the vehicle communication network is initiated, the controller of the first device of the vehicle may determine whether a message to be transmitted is changed, and when it is determined that the message is not changed, the controller of the first device may transmit a no-change flag to the plurality of devices based on a table stored in the memory of the first device, and when receiving a no-change flag from devices of the plurality of devices other than the first device, transmit a message to each of the devices based on the table.

The controller of the first device of the vehicle may identify a destination IP address corresponding to identification information of the message based on the table, and transmit the message to at least one device based on the identified destination IP address.

When receiving a change request flag and identification information of a message, from a third device, the controller of the first device of the vehicle may generate a destination IP address based on the identification information of the received message and identification information of the third device, and allow the generated destination IP address and the identification information of the received message to be matched with each other and stored in the table.

The memory of each device may further store identification information of at least one device and identification information of message to be received with respect to identification information of the at least one device in a reception message identification information table, and when a change flag and identification information of a message are received by a fourth device, the controller of the first device may identify identification information of a message, which is matched with identification information of the fourth device, in the reception message identification information table, and to change the identified identification information of the message so as to correspond to the received identification information of message.

Furthermore, in accordance with embodiments of the disclosure, a control method of a communicator configured to communicate with a plurality of devices in a vehicle communication network may include: when the vehicle communication network is initiated, determining whether a message to be transmitted to a first device of the plurality of devices is changed; when it is determined that the message is not changed, transmitting a no-change flag to the plurality of devices; when receiving a change request flag from the first device, transmitting a list of identification information of the message to the first device; when receiving change information of the message from the first device, generating a destination IP address based on the received change information of the message and identification information of the first device; matching the generated destination IP address with the identification information of the received message; and storing the matched information as an IP address table in a memory.

The control method may further include: when receiving the no-change flag from the plurality of devices, identifying a destination IP address corresponding to identification information of the message based on the IP address table; and transmitting the message to at least one device based on the identified destination IP address.

The control method may further include: when it is determined that a message to be transmitted to a second device of the plurality of devices is changed, transmitting a change flag and identification information of the changed message to the second device; generating a destination IP address based on the identification information of the second device; matching the generated destination IP address with the identification information of the changed message; and storing the matched information in the IP address table.

The storing of the IP address table may include storing identification information of at least one message to be transmitted, identification information of at least one device, and a destination P address in a table.

The control method may further include: when receiving a change request flag and identification information of a message by a third device of the plurality of devices, identifying identification information of a message, which is matched with identification information of the third device, in the reception message identification information table; and changing the identified identification information of message so as to correspond to the received identification information.

The control method may further include: identifying a destination IP address contained in the received message; and when a bit assigned to the communicator is '1' in the identified destination IP address, performing at least one function using the received message.

The control method may further include adding and deleting identification information of the message based on the received change information.

BRIEF DESCRIPTION OF THE DRAWINGS

These and/or other aspects of the disclosure will become apparent and more readily appreciated from the following description of embodiments, taken in conjunction with the accompanying drawings of which:

FIGS. 3A and 3B include exemplary views illustrating a table stored in a memory of the plurality of devices provided in the vehicle according to embodiments of the present disclosure;

FIG. 4 is an exemplary view illustrating IP address assignment of the plurality of devices provided in the vehicle according to embodiments of the present disclosure;

FIG. 9 is an exemplary view illustrating a change in an IP address table of a device provided in the vehicle according to embodiments of the present disclosure;

FIG. 11 is an exemplary view illustrating a change in an IP address table of a device provided in the vehicle according to embodiments of the present disclosure.

Figure 1:
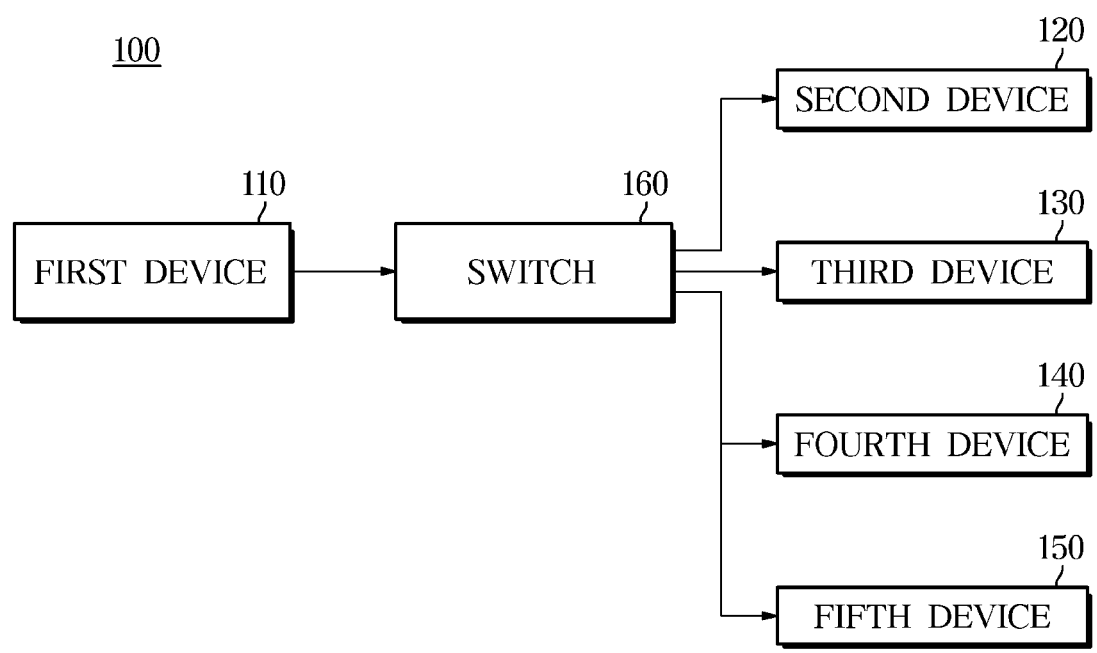
FIG. 1 is a block diagram illustrating a vehicle having a plurality of devices provided with a communicator according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

In the following description, like reference numerals refer to like elements throughout the specification. Well-known functions or constructions are not described in detail since they would obscure the one or more exemplar embodiments with unnecessary detail.

Terms such as "unit", "device" and "apparatus" may be embodied as hardware or software. According to embodiments of the present disclosure, a plurality of "unit", "device" and "apparatus" may be implemented as a single component or a single "unit", "device" and "apparatus" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Reference will now be made in detail to embodiments of the present disclosure, examples of which are illustrated in the accompanying drawings.

Figure 2A:
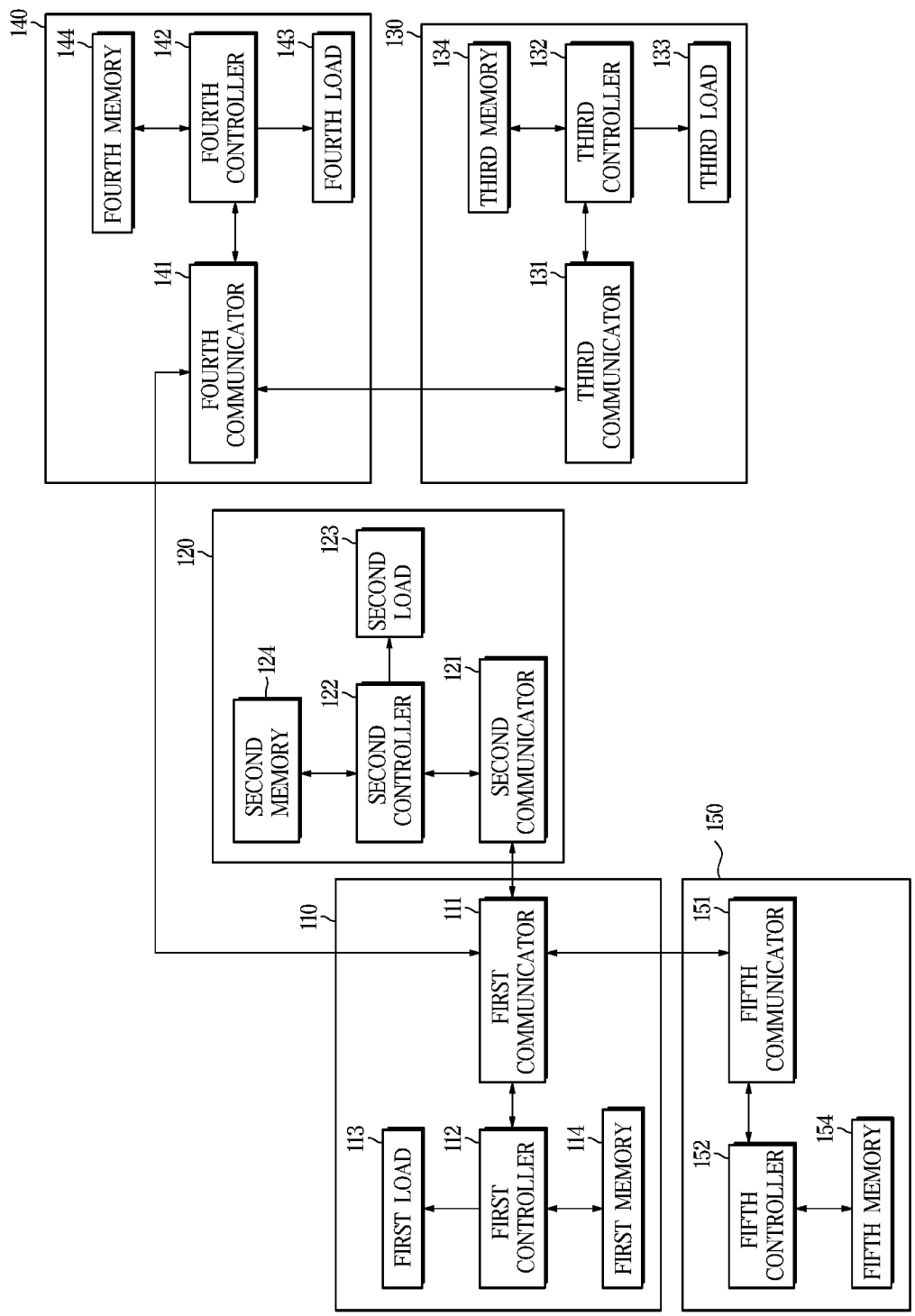
FIG. 2A is a block diagram illustrating the plurality of devices provided in the vehicle of FIG. 1.
Figure 2B:
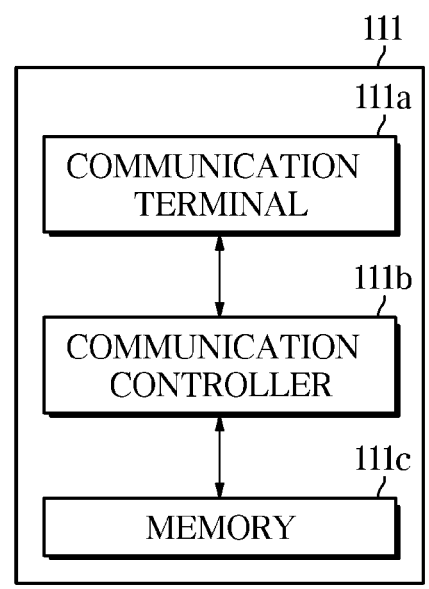
FIG. 2B is a block diagram illustrating the communicator of the plurality of devices provided in the vehicle of FIG. 1.

FIG. 1 is a block diagram illustrating a vehicle having a plurality of devices provided with a communicator according to embodiments of the present disclosure, FIGS. 2A and 2B include block diagrams illustrating the plurality of devices provided in the vehicle of FIG. 1, FIGS. 3A and 3B include exemplary views illustrating IP address assignment of the plurality of devices provided in the vehicle according to embodiments of the present disclosure; and FIG. 4 is an exemplary view illustrating routing between the plurality of devices provided in the vehicle according to embodiments of the present disclosure.

As illustrated in FIG. 1, a vehicle 100 includes a plurality of devices configured to perform at least one function.

By using a communicator that is provided inside each of devices, a plurality of devices 110, 120, 130 and 140 performs a communication with each other, and transmits and receives various messages for performing at least one function during the communication.

The vehicle further includes a switch 160 configured to, when transmitting a message from one of the plurality of devices 110, 120, 130 and 140 to at least one other device, set a message transmission path to the at least one device. The switch 160 may be a router.

In addition, the switch 160 may be implemented as a single device.

A plurality of devices provided in the vehicle will be described as an example.

The plurality of devices provided on the vehicle 100 may include at least two of a lamp, an antenna, a cluster, a head unit, an audio, video, navigation (AVN) terminal, at least one camera, a head-up display (HUD), and an advanced driver assistance system (ADAS). The lamp is provided in an exterior of a vehicle body and configured to allow a user to easily identify information on the surroundings while observing the forward view, and configured to perform signal and communication functions with other vehicle and a pedestrian. The antenna receives signals from GPS satellites and a broadcasting station, and performs a wireless vehicle network (Vehicle to everything (V2X) communication) such as vehicle to vehicle (V2V) communication, and vehicle to infrastructure (V2I) communication, with another vehicle. The cluster is provided in an interior of the vehicle body and the head unit receives an operation command of an audio device and an air conditioner. The at least one camera collects an image of the surroundings of the vehicle for safety and convenience of the user. The head-up display (HUD) projects navigation information to a front window glass so that the front window glass displays the navigation information corresponding to a navigation function.

The plurality of devices may further include an input device, a display device, a parking button for inputting an operation command of an electronic parking brake system (not shown) (EPB button), a power system, a steering system, a brake system configured to apply a braking force to vehicle wheels, and a suspension device configured to regulate a suspension of the vehicle.

The plurality of devices may further include a detector such as a wheel speed sensor, an acceleration sensor, a steering angle sensor, a rain sensor, a yaw sensor, a pressure sensor, and an obstacle sensor.

The plurality of devices may further include a warning system for outputting alarm information in a dangerous situation so that a driver recognizes a dangerous situation of an accident, an automatic emergency braking system (AEBS) for emergency braking by operating the brake system and reducing an output of an engine when another vehicle is placed within a predetermined distance in front of the vehicle, an airbag control system, an Electronic Stability Control (ESC) for maintaining the stability of the vehicle when accelerating or cornering, a tire pressure monitoring system (TPMS), and an Anti-lock Brake System (ABS) for preventing the wheel from being locked at the time of sudden braking.

The warning system may include a Lane Departure Warning System (LDWS) indicating a departure from a lane, a drowsiness warning system indicating that the driver is drowsy state, a blind spot warning system (BSW, BSA or BSD) indicating the risk of collision with other vehicles located in the left and the right side of the lane of the vehicle, and a Forward Collision Warning System (FCWS) and Back Warning System (BWS) indicating the risk of collision with other vehicle located in the front side and the rear side on the same lane of the vehicle.

However, embodiments of the present disclosure are not limited thereto and thus the plurality of devices may further include various electronic devices provided in the vehicle.

As illustrated in FIGS. 2A and 2B, each device 110, 120, 130, and 140 may include a communicator 111, 121, 131, and 141 configured to perform a communication with other device, a controller 112, 122, 132, and 142 configured to generate a control signal based on a message, which is received through the communicator 111, 121, 131, and 141, and an internal program, a load 113, 123, 133, and 143 configured to be operated in response to the generated control signal, and a memory 114, 124, 134, and 144 configured to store identification information of other device, to which a message is to be transmitted, with respect to identification information of a message and store a destination IP address. The controller 112, 122, 132, and 142 may control the communicator so that the communicator transmits a message corresponding to a control signal, to other device.

The memory 114, 124, 134, and 144 may be respectively provided inside of the controller 112, 122, 132, and 142, or alternatively, the memory 114, 124, 134, and 144 may be separately provided from the controller 112, 122, 132, and 142.

In addition, the communicator in each device may include a communication controller and memory configured to control transmission/reception of a message upon the communication with other device. In this case, the controller in each device may be a load controller that controls the operation of the load, and the memory of each device may be a memory in which a program for controlling the operation of the load is stored.

As illustrated in FIG. 2B, a communicator 111 may include a communication terminal 111a electrically and mechanically connected to a communicator of other device, a communication controller 111b configured to assign and change an IP address upon transmitting and receiving a message to and from other device connected through the communication terminal, and a memory 111c configured to store an IP address, in the form of a table and configured to store identification information of a reception message with respect to a device, as a table. This configuration of the communication controller 111b of the communicator 111 is the same as a configuration of IP address assignment and change described later.

For example, as for the plurality of devices illustrated in FIG. 2A, a first device 110 may be the AVN terminal, a second device 120 may be the HUD, a third device 130 may be the cluster, a fourth device 140 may be the head unit, and a fifth device 150 may be the advanced driver assistance system (ADAS).

The AVN terminal corresponding to the first device 110 may include the first communicator 111, a first controller 112, a first load 113 and a first memory 114.

The first communicator 111 of the AVN terminal performs a communication with the communicators of the second, third, fourth, and fifth devices.

The first controller 112 may control at least one of the audio function and the video function based on input information input via an inputter, or the first controller 112 may control the navigation function based on the input information input via the inputter and information, which is detected by the at least one detector (i.e., sensor). In addition, the first controller 112 may control an operation of at least one of a display and a speaker to output information, which is related to at least one function currently performed, through the display and the speaker.

The first controller 112 may control the display so that the display displays information received via the fifth device. The information received through the fifth device may be an image of the outside of the vehicle.

The first load 113 includes at least one of the inputter, the display and the speaker, operates at least one of the display and the speaker based on the control signal of the first controller 112, and transmits input information, which is input via the inputter, to the first controller.

The first memory 114 stores a source IP address of the first device and identification information of other device performing the communication with the first communicator. Particularly, the first memory 114 stores identification information of other device and destination IP address with respect to identification information (ID) of a message that is to be transmitted. The first memory may store identification information of other device, and destination IP address with respect to identification information (ID) of a message, in the form of a table.

As illustrated in FIG. 3A, the first memory 114 stores identification information of the message (msg ID), identification information (ID) of at least one receiving device matched with the identification information of a message, and a destination IP address for each identification information of the message, which are stored in as an IP address table.

The first memory 114 may store identification information of a message, which is to be received, with respect to other device communicated with the first device.

As illustrated in FIG. 3B, the first memory 114 may store identification information of a message with respect to identification information (ID) of other device, which transmits a message to the first device, as a message reception table.

The first controller of the AVN terminal corresponding to the first device 110 may identify whether a message, which is to be transmitted to other device, is changed, based on input information input via the inputter. When it is identified that a message, which is to be transmitted to other device, is changed, the first controller may generate a destination IP address, again, based on identification information of the changed message, and update the table, which is stored in the first memory 114, based on the generated destination IP address.

The HUD corresponding to the second device 120 may include a second communicator 121, a second controller 122, a second load 123 and a second memory 124.

The second communicator 121 of the HUD performs the communication with the communicator of the first device. The second communicator 121 of the HUD may perform the communication with at least one communicator of the third, fourth and fifth devices.

The second controller 112 controls displaying route guidance information, which is to guide a route, based on input information (e.g., message) input via the AVN terminal.

The second load 123 may be a display module. The display module displays the guidance information and reflects the displayed guidance information to be projected onto the front window glass.

The second memory 124 stores identification information of other device performing the communication with the second communicator. Particularly, the second memory 124 stores identification information of other device and a destination IP address with respect to identification information (ID) of a message that is to be transmitted. The second memory may store identification information of other device, and a destination IP address with respect to identification information (ID) of a message, in the form of a table.

When a message, which is to be transmitted to other device, is not present, the second memory 124 may store only source IP address of the second device 120.

The second controller 122 may identify whether a message, which is to be transmitted to other device, is changed, based on information, which is received to the communicator. When it is identified that a message, which is to be transmitted to other device, is changed, the second controller may generate a destination IP address, again, based on identification information of the changed message, and update the table, which is stored in the second memory 124, based on the generated destination IP address.

The cluster corresponding to the third device 130 may include a third communicator 131, a third controller 132, a third load 133 and a third memory 134.

The third communicator 131 of the cluster performs the communication with the communicator of the first and fourth devices. The third communicator 131 of the cluster may perform the communication with at least one communicator of the second and fifth devices.

Based on detection information, which is detected by the at least one detector (i.e., sensor), the third controller 132 controls information such as a tachometer, a speedometer, a coolant temperature indicator, and a fuel indicator, to be displayed in a dial manner, and the third controller 132 controls turning on and off a turn signal indicator, a high beam indicator light, various warning lights, and a transmission selector lever indicator. The third controller 132 controls a trip odometer and an odometer to be displayed in the form of text.

The third load 133 includes a lamp, a display (e.g., LCD), and a gauge in the form of a dial.

The third load 133 turns on and off the lamp based on the control signal of the third controller, displays the text on the display, and moves a needle of the gauge.

The third memory 134 stores a source IP address of the third device and identification information of other device performing the communication with the third communicator. Particularly, the third memory 134 stores identification information of other device and a destination IP address with respect to identification information (ID) of a message that is to be transmitted. The third memory may store identification information of other device, and destination IP address with respect to identification information (ID) of a message, in the form of a table.

The third controller of the cluster corresponding to the third device 130 may identify whether a message, which is to be transmitted to other device, is changed, based on at least one of input information, which is input via the inputter, and detection information, which is detected by the detector. When it is identified that a message, which is to be transmitted to other device, is changed, the third controller may generate a destination IP address, again, based on identification information of the changed message, and update the table, which is stored in the third memory 134, based on the generated destination IP address.

The head unit corresponding to the 140 may include a fourth communicator 141, a fourth controller 142, a fourth load 143 and a fourth memory 144.

The fourth communicator 141 of the head unit performs the communication with the communicator of the first and third devices. The fourth communicator 141 of the head unit may perform the communication with at least one communicator of the second and fifth devices.

The fourth controller 142 may control input information, which is input via the inputter, to be transmitted to the AVN terminal and the cluster, and control at least one of the audio function, radio function, air conditioning function, and hot-wire function, based on the input information input via the inputter. The fourth controller 142 may control an operation of the display to allow the display to display information related to a function currently performed, and control the communication with a user terminal during the connection between the communication terminal and the user terminal.

The fourth load 143 may include an inputter, a display, and a communication terminal provided in the head unit.

The fourth memory 144 stores a source IP address of the fourth device and identification information of other device performing the communication with the fourth communicator. Particularly, the fourth memory 144 stores identification information of other device and a destination IP address with respect to identification information (ID) of a message that is to be transmitted. The fourth memory may store identification information of other device, and a destination IP address with respect to identification information (ID) of a message, in the form of a table.

The fourth controller of the head unit corresponding to the fourth device 140 may identify whether a message, which is to be transmitted to other device, is changed, based on input information, which is input via the inputter. When it is identified that a message, which is to be transmitted to other device, is changed, the first controller may generate a destination IP address, again, based on identification information of the changed message, and update the table, which is stored in the fourth memory 144, based on the generated destination IP address.

The ADAS corresponding to the fifth device 150 may include a fifth communicator 151, a fifth controller 152, a fifth load 153 and a fifth memory 154.

The fifth communicator 151 of the ADAS performs the communication with the communicator of the first device. The fifth communicator 151 of the ADAS may perform the communication with at least one communicator of the first, second, third, and fourth devices.

When an image is received via the at least one camera, the fifth controller 152 performs a control to transmit the received image to the AVN terminal.

The fifth memory 154 stores a source IP address of the fifth device and identification information of other device performing the communication with the fifth communicator. Particularly, the fifth memory 154 stores identification information of other device and a destination IP address with respect to identification information (ID) of a message that is to be transmitted. The fifth memory may store identification information of other device, and a destination IP address with respect to identification information (ID) of a message, in the form of a table.

The fifth controller of the fifth device 150 may identify whether a message, which is to be transmitted to other device, is changed, based on input information, which is input via the inputter. When it is identified that a message, which is to be transmitted to other device, is changed, the fifth controller may generate a destination IP address, again, based on identification information of the changed message, and update the table, which is stored in the fifth memory 154, based on the generated destination IP address.

As described above, at least one device 150 of the plurality of devices may include the communicator 151 configured to perform a communication with other device, the controller 152 configured to generate a control signal based on a message, which is received through the communicator 151, and an internal program, and configured to control the communicator to transmit a message corresponding to the generated control signal to other device, and the memory 154 configured to store identification information of other device, to which a message is to be transmitted, with respect to identification information of a message, and store a destination IP address.

As another example, the fifth device may be a HEV control unit (HCV) outputting a control signal to each of an Engine Control Unit (ECU) controlling the operation of the generator and the engine, a Motor Control Unit (MCU), and a Local Control Unit (LCU) allowing the clutch to be opened or closed by controlling an operation of an actuator. That is, the device including the communicator, the controller and the memory may be a HEV control unit (HCU) having a function of outputting a control signal to the communication, a storage and other controller.

The controller in each device may be a controller for communication and load configured to control transmission and reception of messages and control operation of the load upon the communication with other devices.

The controller of each device may be implemented using a memory (not shown) storing an algorithm for controlling an operation of components in the device and data related to programs implementing the algorithm, and a processor (not shown) performing the above mentioned operation using the data stored in the memory. The memory and the processor may be implemented in separate chips, or a single chip.

The memory of each device may be implemented using at least one of a non-volatile memory element, e.g., a cache, a Read Only Memory (ROM), a Programmable ROM (PROM), an Erasable Programmable ROM (EPROM), an Electrically Erasable Programmable ROM (EEPROM) and a flash memory, a volatile memory element, e.g., a Random Access Memory (RAM), or a storage medium, e.g., a Hard Disk Drive (HDD) and a CD-ROM. The implementation of the memory is not limited thereto.

Each memory may be a memory that is implemented by a chip separate from the above mentioned processor related to the controller, or the memory may be implemented by a single chip with a processor.

Embodiments of the present disclosure will be described with an example in which a controller for communication is provided in a communicator.

By using the same message, each device may be connected to at least one other device, which performs at least one function, through the communicator and perform a mutual communication. That is, the plurality of devices, which is mutually related to each other, may be connected to each other through their respective communicators.

According to embodiments of the present disclosure, the communicator of the plurality of device may perform the communication through Ethernet. A process of performing Ethernet communication in the communicator of the plurality of devices will be briefly described.

When a message is transmitted from one device to other device among the plurality of devices performing Ethernet communication, a communicator of the one device identifies whether a communication network of the other device is occupied or not. When it is identified that the communication network of the other device is not occupied, the communicator transmits a message to the other device. When it is identified that the communication network of the other device is occupied, the communicator is ready for a predetermined period of time, and then identifies whether a communication network of the other device is occupied or not, again.

In addition, when a message is transmitted from one device to two other devices among the plurality of devices performing Ethernet communication, a communicator of the one device identifies whether communication networks of the two other devices are occupied or not. When it is identified that the communication networks of the two other devices are not occupied, the communicator transmits a message to the two other devices. In this case, when simultaneously transmitting the message to the two other, it may lead the conflict.

Accordingly, the communicator of one device identifies whether a message to be transmitted is damaged, and when it is identified that the message is damaged, the communicator identifies whether communication networks of the two other devices are occupied or not, again after being ready for a predetermined period of time, and transmits the message.

In addition, when it is identified that the conflict occurs, the communicator of the one device may transmit the message to the two other devices at predetermined time intervals.

In order to transmit and receive a message to and from other device, the communicator of each device generates an IP address based on identification information of other device, to which the message is to be transmitted, (i.e., a receiving device), stores identification information of at least other device, to which the message is to be transmitted, with respect to identification information of a message, stores an IP address corresponding to the identification information of at least other device with respect to identification information of a message, and stores the generated IP address with respect to identification information of a message.

As described above, as for each device, a configuration of generating and storing identification information of at least other device corresponding to identification information of each of the plurality of messages, and an IP address corresponding to identification information of the plurality of messages may be the same.

In addition, the assignment configuration of the IP address in each device may be the same. This will be described with reference to FIGS. 3A and 3B.

Each device may have a unique source IP address upon operating as a device for transmitting a message, and a destination IP address corresponding to one other device upon transmitting a single message to the one other device (i.e., unicast). In addition, each device may have a destination IP address corresponding to two other devices upon transmitting a single message to the two other devices (i.e., multicast). The IP address assignment rule of each device will be described with an example.

First, byte 1 is started with "10" at unicast and started with "239" at multicast.

Byte 2 that is reserved area may be fixed to '0' (zero).

Byte 3 and 4 may be assigned for each of a device or a controller.

As illustrated in FIG. 4, the head unit may be assigned to bit 0 of byte 3, an integrated Central control unit (ICU) configured to generate a control signal for performing at least one function by receiving a request from other controller and configured to output the generated control signal may be assigned to bit 1 of byte 3, Ethernet switch unit (ESU) may be assigned to bit 2 of byte 3, the AVN terminal may be assigned to bit 3 of byte 3, the reserved area may be assigned to bit 4 to 6 of byte 3, and ERT may be assigned to bit 7 of byte 3.

The right side camera may be assigned to bit 0 of byte 4, the left side camera may be assigned to bit 1 of byte 4, the front side camera may be assigned to bit 2 of byte 4, the rear side camera may be assigned to bit 3 of byte 4, the ADAS may be assigned to bit 4 of byte 4, and the antenna for the communication with the everything (V2X) may be assigned to bit 5 of byte 4, the HUD may be assigned to bit 6 of byte 4, and the cluster may be assigned to bit 7 of byte 4.

When the AVN terminal transmits a message to only head unit, the AVN terminal may generate a destination IP address of 10. 0. 1. 0, wherein "10" represents "unicast", and '1' represents that 8 bit binary code 0000 0001 of byte 3 is converted into decimal code. That is, among devices assigned to byte 3, only device that receives a message may become '1'.

The AVN terminal may have a source IP address of 10. 0. 8. 0, wherein "8" represents that 8 bit binary code 0000 1000 of byte 3 is converted into decimal code.

When the AVN terminal transmits a message to the cluster and the HUD, the AVN terminal may generate a destination IP address of 239. 0. 0. 192, wherein "239" represents "multicast", and "192" represents that 8 bit binary code 1100 0000 of byte 4 is converted into decimal code. That is, among devices assigned to byte 4, the cluster and the HUD that receive a message may become '1'.

Each device may obtain a source IP address and a destination IP address according to the above mentioned IP address assignment rule.

When the communicator of each device transmits a message to other device, the communicator may transmit the message to other device by passing through a path generated in the switch.

Each device and the switch may have the same network architecture. That is, each device and the switch may perform the communication based on the network architecture. This will be described with reference to FIGS. 4A and 4B.

The network architecture may include a total of seven layers.

In other words, the network architecture includes a physical layer corresponding to layer 1, a data link layer corresponding to layer 2, a network layer corresponding to layer 3, a transport layer corresponding to layer 4, a session layer corresponding to layer 5, a presentation layer corresponding to layer 6 and an application layer corresponding to layer 7, wherein a framework for performing the network protocol is defined in seven layers. That is, it is possible to define a method of movement from a device transmitting a message (i.e., a transmitting device) to a device receiving a message (i.e., a receiving device).

Particularly, the physical layer corresponding to layer 1 defines a frame format to move a packet between devices, and provides a rule set for identifying how communicators reacts when two devices simultaneously use a single channel. That is, the physical layer adjusts a function required for transmitting a bit stream through physical medium.

The data link layer corresponding to layer 2 transmits a packet from one device to other device.

The network layer corresponding to layer 3 transmits a packet from one device to other device in a multi-network link.

The transport layer corresponding to layer 4 manages a control and an error between a transmitting device and a receiving device.

The network layer corresponding to layer 3 and the transport layer corresponding to layer 4, use Internet standard, known as Transmission Control Protocol/Internet Protocol (TCP/IP) Suite, to transmit a message to one or more devices. The TCP/IP provide communication protocol features, which are required to perform a functional network (i.e., address assignment rule and mechanism for establishing a connection between a single device and exchange data).

The session layer corresponding to layer 5 tries to recover the connection when the connection is lost. When the connection fails over a long period of time, the session layer stops the connection and then restarts the connection. That is, the session layer may identify and set whether a port connection is valid.

As for the session layer corresponding to layer 5, a port forming a communication session is provided. The session layer corresponding to layer 5 performs synchronization while maintaining interactions between the communicators.

The presentation layer corresponding to layer 6 serves as a data translator of the network. The presentation layer corresponding to layer 6 is a part of the operating system. The presentation layer corresponding to layer 6 converts data that is input or output, into a presentation form. For example, the presentation layer corresponding to layer 6 performs serialization, encoding, and encryption.

The application layer corresponding to layer 7 allows a user to access the network.

Figure 5A:
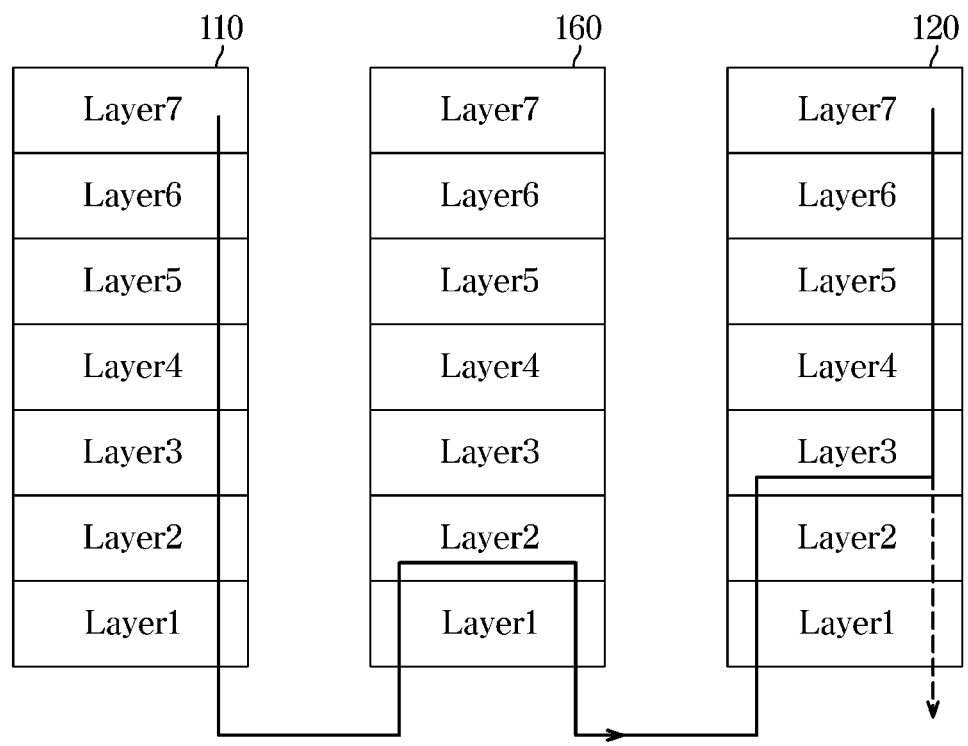
FIGS. 5A and 5B are an exemplary view illustrating routing between the plurality of devices provided in the vehicle according to embodiments of the present disclosure.

As illustrated in FIG. 5A, a case in which a message is transmitted from the first device 110 to the second device 120 will be described as an example.

The application layer of the first device 110 transmits a message to the transport layer. In this case, the transport layer of the first device 110 receives the message from the application layer, divides it to the packet, adds a TCP header and then transmits it to the network layer.

The network layer of the first device 110 counts a destination IP to the received packet, counts a trailer for error detection to the received packet, and transmits the IP packet including the trailer, to the data link layer.

The data link layer of the first device 110 includes Ethernet protocol, assigns a Media Access Control (MAC) address corresponding to a physical address, and transmits a packet, to which the MAC address is assigned, to the physical layer. The physical layer of the first device 110 transmits the packet to the switch in a hardware manner.

In addition, upon the assignment of the mac address of the first device 110, the MAC address may be mapped to the destination IP address on a one to one basis The data link layer of the first device 110 may count Ethernet header to the IP packet.

The data link layer of the first device 110 performs framing on the message of IP packet according to the network transmission method, and transmits the framed packet to the physical layer.

The framed packet may be a frame and the frame may include a message, a header, and a trailer. The header may include a MAC address. That is, the data link layer of the first device 110 transmits the frame to the physical layer.

The physical layer of the first device 110 changes the frame to a bit, changes the bit to a signal, and transmits the signal to the switch.

The switch 160 receives the packet of the first device 110 through the physical layer and transmits the received packet to the data link layer.

The data link layer of the switch 160 identifies a destination IP address that is mapped on the MAC address on a one to one basis, selects a device, to which a message is to be transmitted, based on the identified destination IP address, and sets a path based on identification information of the selected device.

When the selected device is the second device 120, the switch 160 may connect the first device 110 to the second device 120 through the communication.

The second device 120 receives the packet through the physical layer, and transmits the received packet to the data link layer.

The physical layer of the second device 120 may convert the received signal to a bit and transmits a frame corresponding to the bit.

The data link layer of the second device 120 transmits an IP packet, in which Ethernet header is stripped from the received frame, to the network layer.

The data link layer of the second device 120 identifies whether an error is present in the received IP packet. When it is identified that the error is not present, the data link layer of the second device 120 transmits the IP packet to the network layer and when it is identified that the error is present, the data link layer of the second device 120 deletes the IP packet.

The network layer of the second device 120 identifies a destination IP address and identifies whether the second device 120 is a message reception target or not, based on the identified destination IP address. When it is identified that the second device 120 is a message reception target, the network layer of the second device 120 identifies whether a message to be received is present. When it is identified that a message to be received is present, the network layer of the second device 120 strips the IP header, and transmits the packet to the transport layer. When it is identified that the second device 120 is not a message reception target or when it is identified that a message to be received is not present, the network layer of the second device 120 deletes the received packet, and returns the received packet to the data link layer and the physical layer.

When a TCP header is present, the transport layer of the second device 120 strips the TCP header, and transmits the message to the application layer through the session layer and the presentation layer.

The application layer of the second device 120 recognizes the message and provides a user interface based on the recognized message.

Figure 5B:
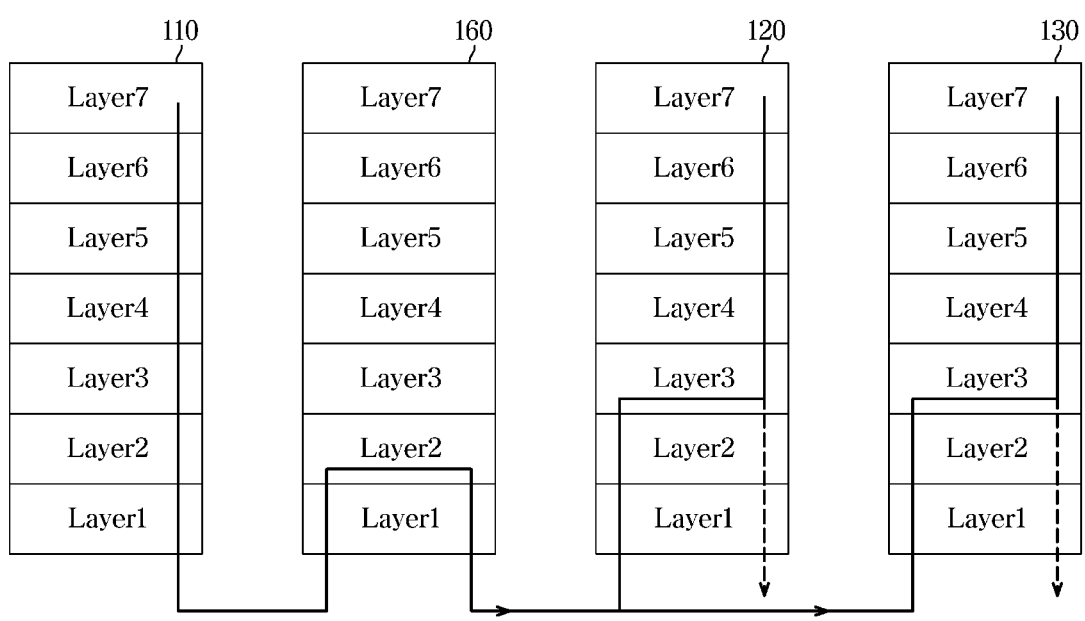

As illustrated in FIG. 5B, a case in which a message is transmitted from the first device 110 to the second device 120 and the third device 130 will be described as an example.

The switch 160 selects a device, to which a message is to be transmitted, based on the packet of the first device 110. When the selected device is the second device 120 and the third device 130, the switch 160 may connect the first device 110 to the second device 120 through the communication, and connect the first device 110 to the third device 130 through the communication.

In the same manner as the second device 120, the third device 130 receives the packet of the first device 110 through the physical layer, and transmits the received packet to the data link layer.

The physical layer of the second device 130 may convert the received signal to a bit and transmits a frame corresponding to the bit.

The data link layer of the third device 130 transmits an IP packet, in which Ethernet header is stripped from the received frame, to the network layer.

The data link layer of the third device 130 identifies whether an error is present in the received IP packet. When it is identified that the error is not present, the data link layer of the third device 130 transmits the IP packet to the network layer and when it is identified that the error is present, the data link layer of the second device 120 deletes the IP packet.

The network layer of the third device 130 identifies a destination IP address and identifies whether the third device 130 is a message reception target or not, based on the identified destination IP address. When it is identified that the third device 130 is a message reception target, the network layer of the third device 130 identifies whether a message to be received is present. When it is identified that a message to be received is present, the network layer of the third device 130 strips the IP header, and transmits the packet to the transport layer. When it is identified that the third device 130 is not a message reception target or when it is identified that a message to be received is not present, the network layer of the third device 130 deletes the received packet, and returns the received packet to the data link layer and the physical layer.

When a bit assigned to the third device 130 is '1' among the destination IP address, the network layer of the third device 130 may identify that the third device 130 is a message reception target.

When a TCP header is present, the transport layer of the third device 130 strips the TCP header, and transmits the message to the application layer through the session layer and the presentation layer.

The application layer of the second device 130 recognizes the message and provides a user interface based on the recognized message.

In addition, the first device 110 may transmit the message to the third device 120 after transmitting the message to the second device 120.

In this manner, it is possible to transmit a message from one device to at least one other device.

Hereinafter a communication control method for a plurality of devices in the vehicle will be described with reference to FIGS. 6 to 10.

Figure 6:
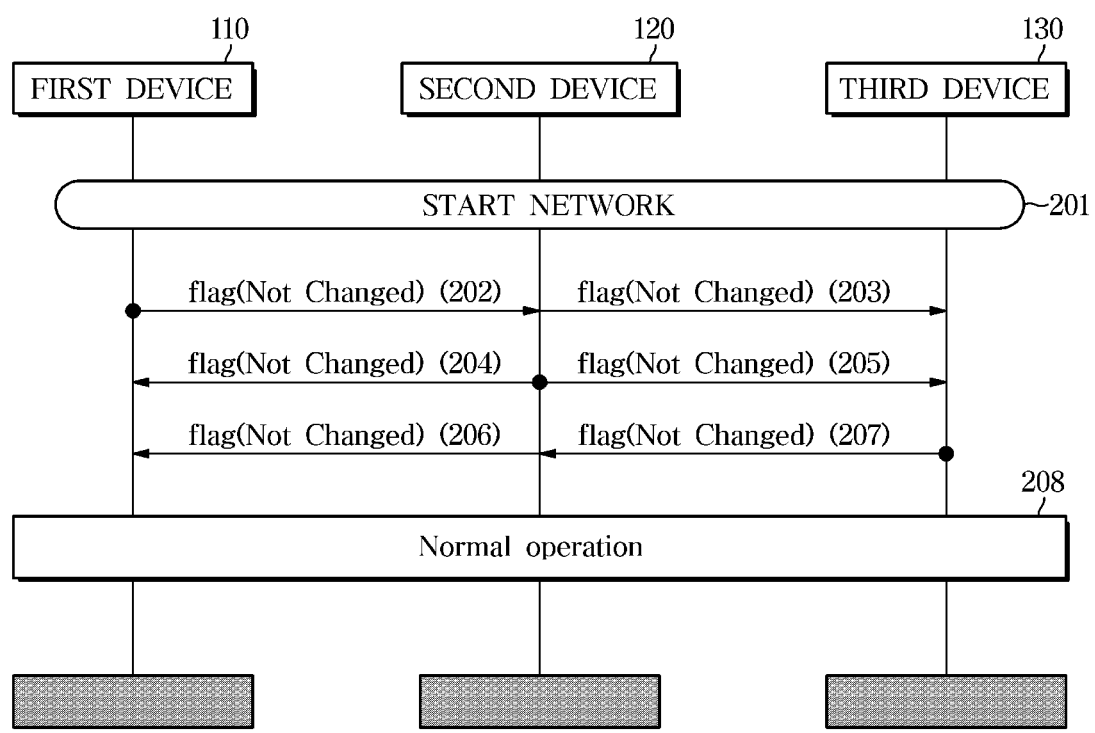
FIG. 6 is a flowchart illustrating an example of a communication control method of the plurality of devices provided in the vehicle according to embodiments of the present disclosure.

FIG. 6 is a flowchart of a communication control method upon transmitting a message from the first device 110 to the second and third devices 120 and 130. Particularly, FIG. 6 is a flowchart of a communication control method when there is no change in a message transmitted from the first device 110 to the second and third devices 120 and 130 and a message received from the second and third devices 120 and 130.

When the network is initiated (i.e., woken up) (201), the first device 110 identifies identification information of a message (msg ID), identification information of a receiving device matched with the identification information of a message, and a destination IP address with respect to identification information of a message, which are stored in the table of the first memory, and identifies whether there is a change in the message to be transmitted.

When it is identified that there is no change in the message transmitted to the receiving devices 120 and 130, the first device 110 transmits a no-change flag indicating that there is no change, to the second device 120 based on the table stored in the first memory (202) and transmits a no-change flag indicating that there is no change, to the third device 130 based on the table stored in the first memory (203).

When receiving the no-change flag, the second device 120 identifies whether there is a change in a message to be received by the second device 120, and when it is identified that there is no change, the second device 120 transmits a no-change flag indicating that there is no change, to the first device 110 (204).

In addition, when performing the communication with the third device 130, the second device 120 may transmit a no-change flag indicating that there is no change in a message to be transmitted, to the third device 130 (205).

When receiving the no-change flag, the third device 130 identifies whether there is a change in a message to be received by the third device 130, and when it is identified that there is no change, the third device 130 transmits a no-change flag indicating that there is no change, to the first device 110 (206).

In addition, when performing the communication with the second device 120, the third device 130 may transmit a no-change flag indicating that there is no change in a message to be transmitted, to the second device 120 (207).

When receiving the no-change flag from the second and third devices, the first device 110 performs a function of the first device 110 by transmitting a message to each device based on the table stored in the first memory (208). In this time, the second and third devices perform a function of each device by using the message received from the first device (208).

Figure 7:
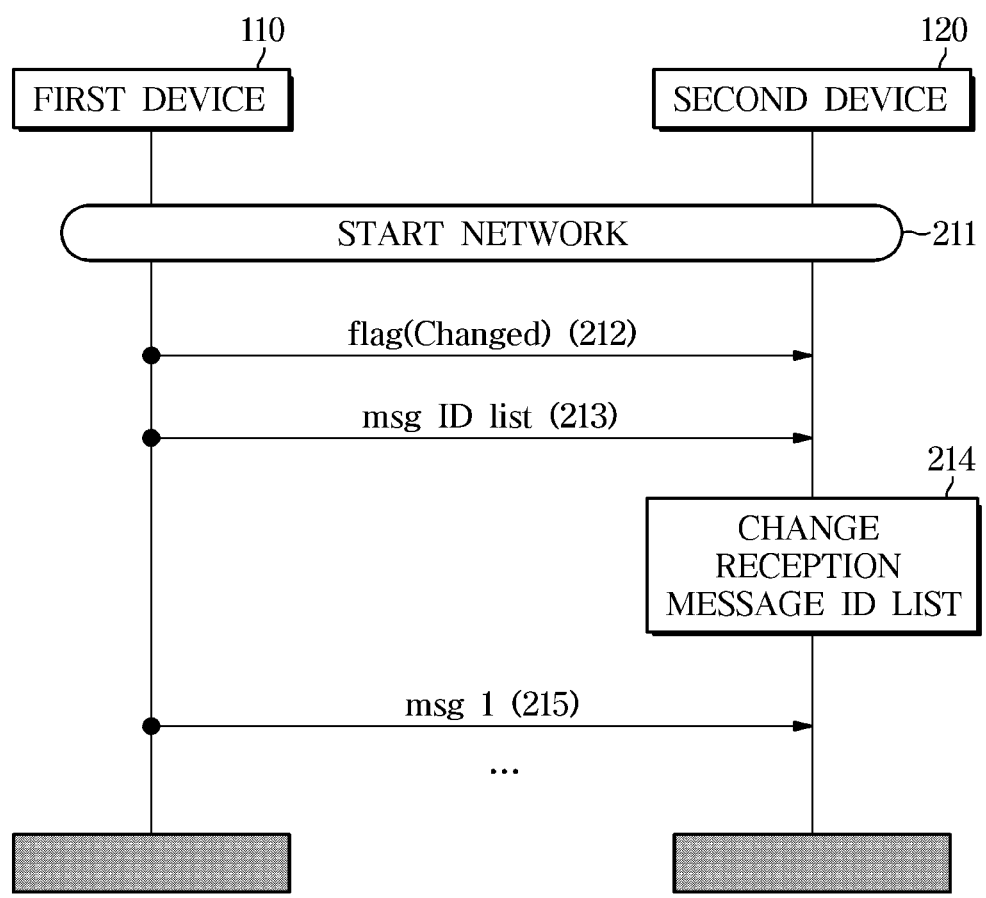
FIG. 7 is a flowchart illustrating another example of the communication control method of the plurality of devices provided in the vehicle according to embodiments of the present disclosure.

FIG. 7 is a flowchart of a communication control method upon transmitting a message from the first device 110 to the second device 120. Particularly, FIG. 7 is a flowchart of a communication control method when there is a change in a message transmitted from the first device 110 to the second device 120.

When the network is initiated (i.e., woken up) (211), the first device 110 identifies identification information of a message (msg ID), identification information of a receiving device matched with the identification information of a message, and a destination IP address with respect to identification information of a message, which are stored in the table of the first memory, and identifies whether there is a change in the message to be transmitted.

When it is identified that there is a change in the message transmitted to the receiving device 120, the first device 110 transmits a change flag indicating that there is a change, to the second device 120 based on the table stored in the first memory (212) and transmits a list of identification information of message to be transmitted to the second device 120 (msg ID) (213).

When receiving the change flag and the list of identification information of message (msg ID), the second device 120 changes a list of identification information of message of the first device in the message reception table stored in the second memory, into the received list of identification information of message (214).

Figure 8:
FIG. 8 is an exemplary view illustrating a change in a reception message identification information table of a device provided in the vehicle according to embodiments of the present disclosure.

As illustrated in FIG. 8, the second device 120 changes the list of identification information of message, which is matched with identification information of the first device (D1), into the received list of identification information of message.

In addition, when the received list of identification information of message has identification information of a message, which is not present in the stored list of identification information of message, the second device 120 may add the identification information of a message, which is not present, as identification information of a message which is to be received from the first device, and when the received list of identification information of message has identification information of a message, which is present in the stored list of identification information of message, the second device 120 may delete the stored list of identification information of message.

As illustrated in FIG. 9, when transmitting the first message (msg 1) to only second device, the first device changes an IP address table.

Based on the changed IP address table, the first device transmits each message to at least one other device communicated with the first device. In this case, the first device may transmit the message to only second device (215).

The first device performs a function of the first device. The second device receives the first message from the first device and performs a function of the second device based on the received first message.

Figure 10:
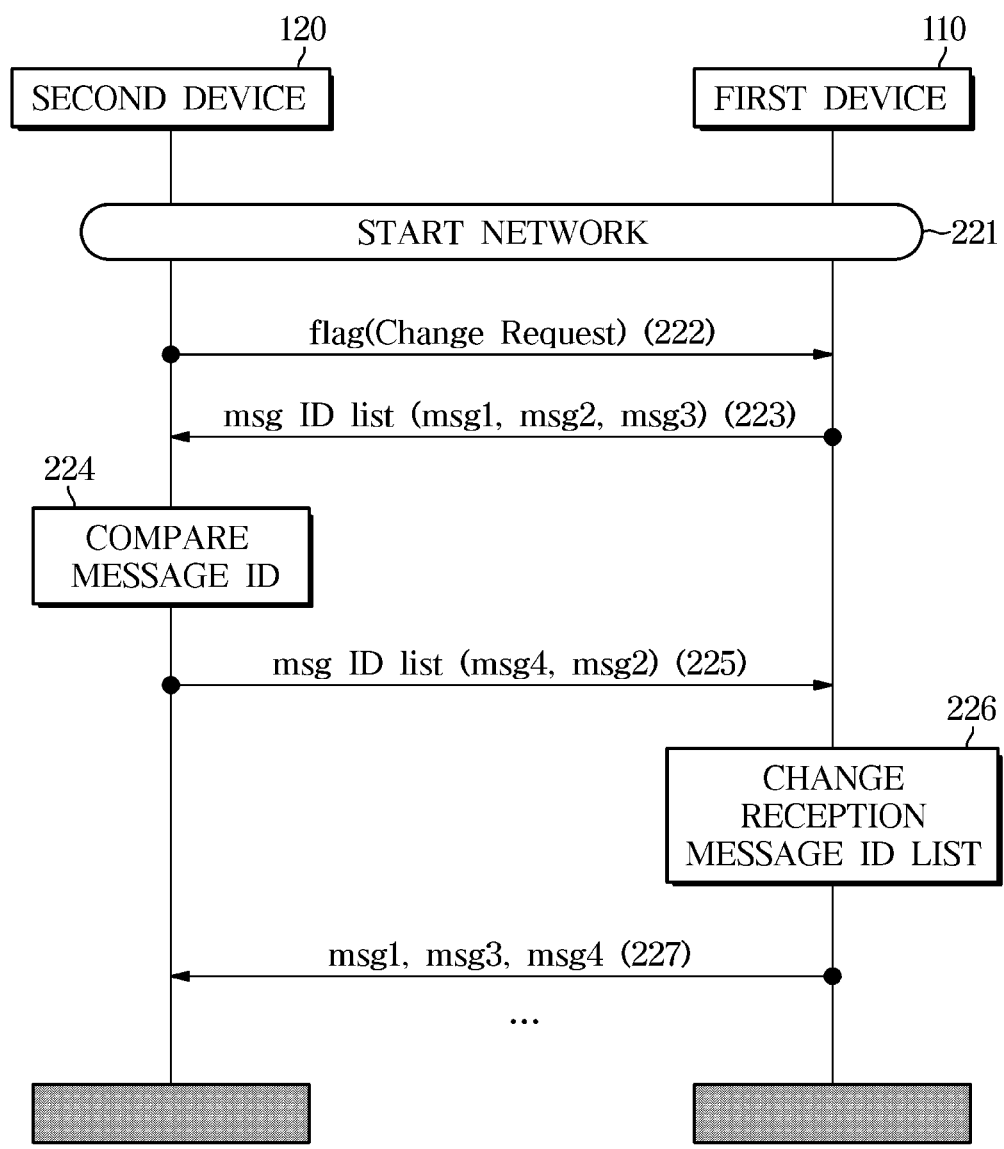
FIG. 10 is a flowchart illustrating still another example of the communication control method of the plurality of devices provided in the vehicle according to embodiments of the present disclosure.

FIG. 10 is a flowchart of a communication control method upon transmitting a message from the first device 110 to the second device 120. Particularly, FIG. 10 is a flowchart of a communication control method when there is a change in a message to be received by the second device 120.

When the network is initiated (i.e., woken up) (221), the second device 120 transmits a change request flag to the first device (222).

When receiving the change request flag from the second device, the first device transmits a list of identification information of message, which is to be transmitted to the second device 120 (msg ID) among information stored in the table of the first memory, to the second device (223).

The second device 120 identifies the list of identification information of message, which is to be received from the first device 110, stored in the second memory.

The second device 120 compares the list of identification information of message stored in the second memory, with identification information of a message which is to be changed, and obtains change information of message.

At this time, the second device obtains identification information of a message, which is to be added, and identification information of a message, which is to be deleted, among the list of identification information of message stored in the second memory, and transmits the obtained identification information of a message, which is to be added, and identification information of a message, which is to be deleted, to the first device (225). That is, the second device 120 transmits change information of a message, which is to be received from the first device, to the first device. The change information of message may include addition message identification information and deletion message identification information.

When receiving the addition message identification information and the deletion message identification information, the first device 110 changes an IP address table stored in the first memory of the first device (226).

Particularly, when the list of identification information of message, which is to be transmitted to the second device, stored in the first memory includes the received identification information of message, the first device 110 deletes the received identification information of message. When the list of identification information of message does not include the received identification information of message, the first device 110 adds the received identification information of message to the list of identification information of message, as identification information of message, which is to be transmitted to the second device.

For example, when receiving identification information of messages msg4, and msg2 in a state in which identification information of message msg1, msg2, and msg3 are stored in the list of identification information of message, which is to be transmitted from the first device to the second device, identification information of message msg4 is added to the list of identification information of message, which is to be transmitted to the second device, and identification information of message msg2 is deleted from the list of identification information of message, which is to be transmitted to the second device. That is, the list of identification information of message, which is to be transmitted to the second device, stored in the first memory, includes identification information of message msg1, identification information of message msg3, and identification information of message msg4.

As illustrated in FIG. 11, the first device 110 changes an IP address table based on the list of identification information of message, which is to be transmitted to the second device.

Based on the changed IP address table, the first device 110 transmits each message to at least one other device communicated with the first device. In this case, the first device may transmit the first message (msg1), the second message (msg2), and the third message (msg3) to the second device (227).

The first device performs the function of the first device. The second device 120 receives the first message (msg1), the second message (msg2), the third message (msg3) and the fourth message (msg 4) from the first device, and performs the function of the second device by using the received first message (msg1), second message (msg2), third message (msg3), and further message (msg 4).

As is apparent from the above description, according to the proposed vehicle and control method thereof, it may be possible to increase the scalability of Ethernet by dynamically assigning an IP address with respect to a message to be transmitted to other device.

Despite of a receiving device is changed due to the update of additional function after the development process or manufacturing of the vehicle, it may be possible to change an IP address of only device, in which a change is present, and thus it may be possible to allow the plurality of devices inside of the vehicle to be operated normally without changing an IP address of a relevant controller or an IP address of devices on the network.

That is, although a receiver is changed due to the software update, such as a case in which a receiver of a previous message is added or deleted, it may be possible to allow the plurality of devices inside of the vehicle to be operated normally without changing an IP address of a relevant controller or an IP address of a relevant device on the network.

Although a controller, a new controller or a new device is mounted for the option of the vehicle, it may be possible to allow the plurality of devices inside of the vehicle to be operated normally without changing an IP address of a relevant controller or an IP address of a relevant device on the network. That is, since Plug and Play function is provided according to embodiments of the present disclosure, it is easy to use.

Since it is possible to change only destination IP address for a changed message, it may be possible to minimize a time for assigning a dynamic IP address.

It may be possible to improve the quality of the communicator and the vehicle, and further increase the user's satisfaction, thereby improving user convenience.

Although certain embodiments of the present disclosure have been shown and described, it would be appreciated by those skilled in the art that changes may be made in these embodiments without departing from the principles and spirit of the disclosure, the scope of which is defined in the claims and their equivalents.

| Description of symbols | |
|---|---|
| 100: vehicle | 110: first device |
| 120: second device | 130: third device |
| 140: fourth device | 150: fifth device |
| 160: switch | |

What is claimed is:

1. A device that communicates with a plurality of devices comprising:
   a communicator configured to provide a vehicle communication network using a network architecture including a physical layer, a data link layer, a network layer, and an application layer,
   a memory configured to match a destination Internet Protocol (IP) address, to which at least one message is transmitted, with identification information of the at least one message, and to store the matched destination IP address and identification information in a table; and
   a controller configured to transmit a change flag when a message to be transmitted to a first device of the plurality of devices is changed, to transmit identification information of the changed message to the first device, to generate a destination IP address based on identification information of the first device, and to allow the generated destination IP address and the identification information of the changed message to be matched with each other and stored in the table,
   wherein the memory is further configured to change the destination IP address with respect to the identification information of the at least one message stored in the table in response to a control signal transmitted by the controller,
   wherein, when a packet is received, the network layer identifies a destination IP address in the received packet, and when a bit assigned to the device is '1' among the destination IP address, identifies that the device is a message reception target,
   wherein the application layer performs an operation corresponding to the message, and
   wherein, when it is identified that the device is not the message reception target, the network layer deletes the received packet, and returns the received packet to the data link layer and the physical layer.

2. The device of claim 1, wherein
   the controller is further configured to transmit the changed message to the first device based on the identification information of the at least one message stored in the table.

3. The device of claim 1, wherein
   when the vehicle communication network is initiated, the controller is further configured to determine whether a message to be transmitted to the first device is changed, to transmit a no-change flag to the plurality of devices based on the table when it is determined that the message is not changed, and to transmit a message to each of the plurality of devices based on the table when receiving the no-change flag from the plurality of devices.

4. The device of claim 3, wherein
   the controller is further configured to identify a destination IP address corresponding to identification information of the message based on the table, and to transmit the message to the first device based on the identified destination IP address.

5. The device of claim 1, wherein
   when the vehicle communication network is initiated, the controller is configured to determine whether a message to be transmitted to the device is changed, to transmit a no-change flag to the plurality of devices when it is determined that the message is not changed, to generate a destination IP address based on the identification information of the received message and identification information of a second device of the plurality of devices when receiving a change request flag and identification information of a message from the second device, and to allow the generated destination IP address and the identification information of the received message to be matched with each other and stored in the table.

6. The device of claim 1, wherein
   the memory is further configured to store identification information of the first device and identification information of a message to be received with respect to identification information of the first device in a reception message identification information table, and
   when a change flag and identification information of a message is received by a second device among the plurality of devices, the controller is further configured to identify identification information of a message, which is matched with identification information of the second device, in the reception message identification information table, and to change the identified identification information of the message so as to correspond to the received identification information of message.

7. The device of claim 1, wherein
   the memory is further configured to match identification information of the first device with identification information of the at least one message and to store the matched information in a table; and
   the controller is further configured to transmit a change request flag to a second device among the plurality of devices when a message to be received from the second device is changed, to compare identification information of the at least one message stored in the table with a list of identification information of message received from the second device, to obtain change information of the at least one message, and to transmit the obtained change information of the at least one message to the second device.

8. The device of claim 7, wherein
when the vehicle communication network is initiated, and when receiving a no-change flag from the second device, the controller is further configured to determine whether a message to be transmitted and a message to be received are changed, and when it is determined that the message to be transmitted and the message to be received are not changed, to transmit the no-change flat to the second device.

9. A vehicle comprising:
a plurality of devices in a vehicle communication network, wherein each of the plurality of devices includes:
a communicator configured to communicate with at least one other device using a network architecture including a physical layer, a data link layer, a network layer, and an application layer;
a memory configured to store a destination IP address table and a reception message table; and
a controller configured to allow a message to be transmitted to the at least one other device based on the destination IP address table and identification information of a message, wherein, when a message, which is transmitted to a second device, is changed, a controller of a first device among the plurality of devices is configured to transmit a change flag and identification information of the changed message to the second device, to generate a destination IP address based on identification information of the second device, and to allow the generated destination IP address and the identification information of the changed message to be matched with each other and stored in the memory of the second device,
wherein, when a packet is received, the network layer of the first device identifies a destination IP address in the received packet, and when a bit assigned to the first device is '1' among the destination IP address, identifies that the first device is a message reception target,
wherein the application layer of the first device performs an operation corresponding to the message, and
wherein, when it is identified that the first device is not the message reception target, the network layer of the first device deletes the received packet, and returns the received packet to the data link layer of the first device and the physical layer of the first device.

10. The vehicle of claim 9, wherein
when transmitting the changed message, the controller of the first device is configured to transmit the changed message to the second device based on the generated destination IP address.

11. The vehicle of claim 9, wherein
when the vehicle communication network is initiated, the controller of the first device is configured to determine whether a message to be transmitted is changed, and when it is determined that the message is not changed, the controller of the first device is configured to transmit a no-change flag to the plurality of devices based on a table stored in the memory of the first device, and when receiving a no-change flag from devices of the plurality of devices other than the first device, to transmit a message to each of the devices based on the table.

12. The vehicle of claim 11, wherein
the controller of the first device is further configured to identify a destination IP address corresponding to identification information of the message based on the table, and to transmit the message to the at least one other device based on the identified destination IP address.

13. The vehicle of claim 1, wherein
when receiving a change request flag and identification information of a message from a third device, the controller of the first device is further configured to generate a destination IP address based on the identification information of the received message and identification information of the third device, and to allow the generated destination IP address and the identification information of the received message to be matched with each other and stored in the table.

14. The vehicle of claim 9, wherein
the memory of each device is further configured to store identification information of at least one device and identification information of message to be received with respect to identification information of the at least one device in a reception message identification information table, and
when a change flag and identification information of a message are received by a fourth device, the controller of the first device is configured to identify identification information of a message, which is matched with identification information of the fourth device, in the reception message identification information table, and to change the identified identification information of the message so as to correspond to the received identification information of message.

15. A control method of a device configured to communicate with a plurality of devices in a vehicle communication network, the control method comprising:
when the vehicle communication network is initiated, determining whether a message to be transmitted to a first device of the plurality of devices is changed;
when it is determined that the message is not changed, transmitting a no-change flag to the plurality of devices;
when receiving a change request flag from the first device, transmitting a list of identification information of the message to the first device;
when receiving change information of the message from the first device, generating a destination IP address based on the received change information of the message and identification information of the first device;
matching the generated destination IP address with the identification information of the received message;
storing the matched information as an IP address table in a memory;
identifying, by a network layer of the device, a destination IP address, when a packet is received;
identifying, by the network layer of the device, that the device is a message reception target, when a bit assigned to the device is '1' among the destination IP address:
performing, by an application layer of the first device, an operation corresponding to the message;
deleting, by the network layer of the device, the received packet, when it is identified that the device is not the message reception target; and
returning, by the network layer of the device, the received packet to a data link layer of the device and a physical layer of the device.

16. The control method of claim 15, further comprising:
when receiving the no-change flag from the plurality of devices, identifying a destination IP address corresponding to identification information of the message based on the IP address table; and transmitting the message to at least one device based on the identified destination IP address.

17. The control method of claim 15, further comprising:

when it is determined that a message to be transmitted to a second device of the plurality of devices is changed, transmitting a change flag and identification information of the changed message to the second device;

generating a destination IP address based on the identification information of the second device;

matching the generated destination IP address with the identification information of the changed message; and storing the matched information in the IP address table.

18. The control method of claim 15, wherein the storing of the IP address table comprises storing identification information of at least one message to be transmitted, identification information of at least one device, and a destination IP address in a table.

19. The control method of claim 15, further comprising:

when receiving a change request flag and identification information of a message by a third device of the plurality of devices, identifying identification information of a message, which is matched with identification information of the third device, in the reception message identification information table; and changing the identified identification information of message so as to correspond to the received identification information.

20. The control method of claim 15, further comprising:

adding and deleting identification information of the message based on the received change information.

* * * * *